(12) United States Patent
Tsai et al.

(10) Patent No.: US 8,419,262 B2
(45) Date of Patent: *Apr. 16, 2013

(54) LIGHT GUIDE APPARATUS FOR BACKLIGHT MODULE

(75) Inventors: Chung-Lin Tsai, Taoyuan (TW); Guo-Chen Lee, Taoyuan (TW); Wei-An Hua, Taoyuan (TW); Tsung-Yung Hung, Taoyuan (TW); I-Ping Huang, Taoyuan (TW)

(73) Assignee: Global Lighting Technologies Inc., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/189,479

(22) Filed: Jul. 22, 2011

(65) Prior Publication Data

US 2011/0280046 A1     Nov. 17, 2011

Related U.S. Application Data

(63) Continuation-in-part of application No. 13/172,875, filed on Jun. 30, 2011, which is a continuation of application No. 12/464,104, filed on May 12, 2009, now Pat. No. 7,997,784.

(51) Int. Cl.
*F21V 7/04* (2006.01)

(52) U.S. Cl.
USPC ................. 362/621; 362/602; 362/97.1

(58) Field of Classification Search ............. 362/602, 362/621, 559, 97.1
See application file for complete search history.

(56) References Cited

U.S. PATENT DOCUMENTS

2007/0230215 A1* 10/2007 Chang ..................... 362/613
2010/0067220 A1* 3/2010 Chiu et al. .............. 362/97.1

* cited by examiner

*Primary Examiner* — David V Bruce
(74) *Attorney, Agent, or Firm* — Jianq Chyun IP Office

(57) ABSTRACT

A light guide apparatus for a backlight module is disclosed, which includes a light guide plate, a circuit having a plurality of circuit contacts integrated with the light guide plate, and a light source disposed on the light guide plate and electrically contacted to the plurality of circuit contacts.

16 Claims, 7 Drawing Sheets

US 8,419,262 B2

LIGHT GUIDE APPARATUS FOR BACKLIGHT MODULE

CROSS-REFERENCE TO RELATED APPLICATION

This application is a continuation-in-part application of and claims the priority benefit of U.S. application Ser. No. 13/172,875, filed on Jun. 30, 2011, now pending. The prior application Ser. No. 13/172,875 is a continuation application of and claims the priority benefit of U.S. application Ser. No. 12/464,104, filed on May 12, 2009, now allowed. The entirety of each of the above-mentioned patent applications is hereby incorporated by reference herein and made a part of this specification.

BACKGROUND OF THE INVENTION

1. Field of the Invention

The present invention relates to a light guide structure including a light guide plate and a light source, and being adapted for a backlight module.

2. The Prior Arts

Backlight modules are now widely used in many kinds of electronic products. For example, displays of notebook computers, mobile phones, and liquid crystal televisions do not emit light by themselves, and require backlight modules for providing light sources.

A typical backlight module includes a light guide plate and a light source. Light emitting diodes (LED) are often employed serving as light sources of backlight modules for those electronic products demanding a relatively thin thickness. With respect to such a backlight module, the LED light source is positioned at a lateral side of the light guide plate. The light guide plate has a first surface and a second surface opposite to the first surface. A reflective sheet is provided at the first surface, and a plurality of optical sheets including a diffusing sheet and a prism sheet are provided at the second surface. An outer frame is provided for framing all of the components. In operation, the LED light source emits a light, and the light is inputted into light guide plate from the lateral side of the light guide plate. A part of the light is reflected by the reflective sheet, and sequentially passes through the diffusing sheet and the prism sheet, and is then outputted therefrom.

When serving for a backlight module having a relatively small area, the light sources are usually provided at one lateral side of the light guide plate. However, when serving for a backlight module having a relatively large area, if the light sources are only provided at one side of the light guide plate, the light inputted into the light guide plate gradually attenuates while being transmitted to the other side of the light guide plate. This often causes a nonuniform illuminating condition of the light guide plate. As such, a large size light guide plate is often provided with light sources at both sides for solving the problem of the single side light sources.

FIG. 1 is a schematic diagram illustrating a conventional backlight module including a light guide plate and light sources assembled together. Referring to FIG. 1, no matter the light sources are provided to one side, two sides, or even more sides of the light guide plate 1, the conventional backlight module is generally configured by providing LEDs 2 onto a circuit board 3, and then assembling the LEDs 2 and the circuit board together to the lateral side(s) of the light guide plate 1. Accordingly, in fabricating such a backlight module, the LEDs 2 must be previously welded to the circuit board 3. Then, the circuit board 3, together with the LEDs 2 welded thereon, is secured to the light guide plate 1. As such, the process of the fabrication is relatively complex, and needs a high fabrication cost.

SUMMARY OF THE INVENTION

The invention provides a solution to the problem of the conventional backlight module, in which the fabrication process of providing the LEDs serving as light sources to the light guide plate is complex and costly.

An embodiment of the invention provides a light guide apparatus for a backlight module, which includes a light guide plate including a recessed compartment, a circuit integrated with the light guide plate and having a plurality of circuit contacts near the recessed compartment, a light source disposed in the recessed compartment, and a conductive layer electrically bridging the light source to the circuit contacts. The conductive layer can be a metal layer, a graphite layer, an anisotropic conductive film, a silver paste layer, a soldering layer, or an adhesive. The recessed compartment can be a recess or a hole. The recessed compartment can be disposed adjacent to a lateral side of the light guide plate. The recessed compartment can be disposed at a lateral side of the light guide plate. The recessed compartment can be disposed near a center area of the light guide plate. Plural recessed compartments are disposed on opposite lateral sides of the light guide plate. Plural light sources are disposed in the recessed compartment, and plural conductive layers electrically bridge the light sources to the circuit. The conductive layer can surround the recessed compartment. The conductive layer can be a sheet.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
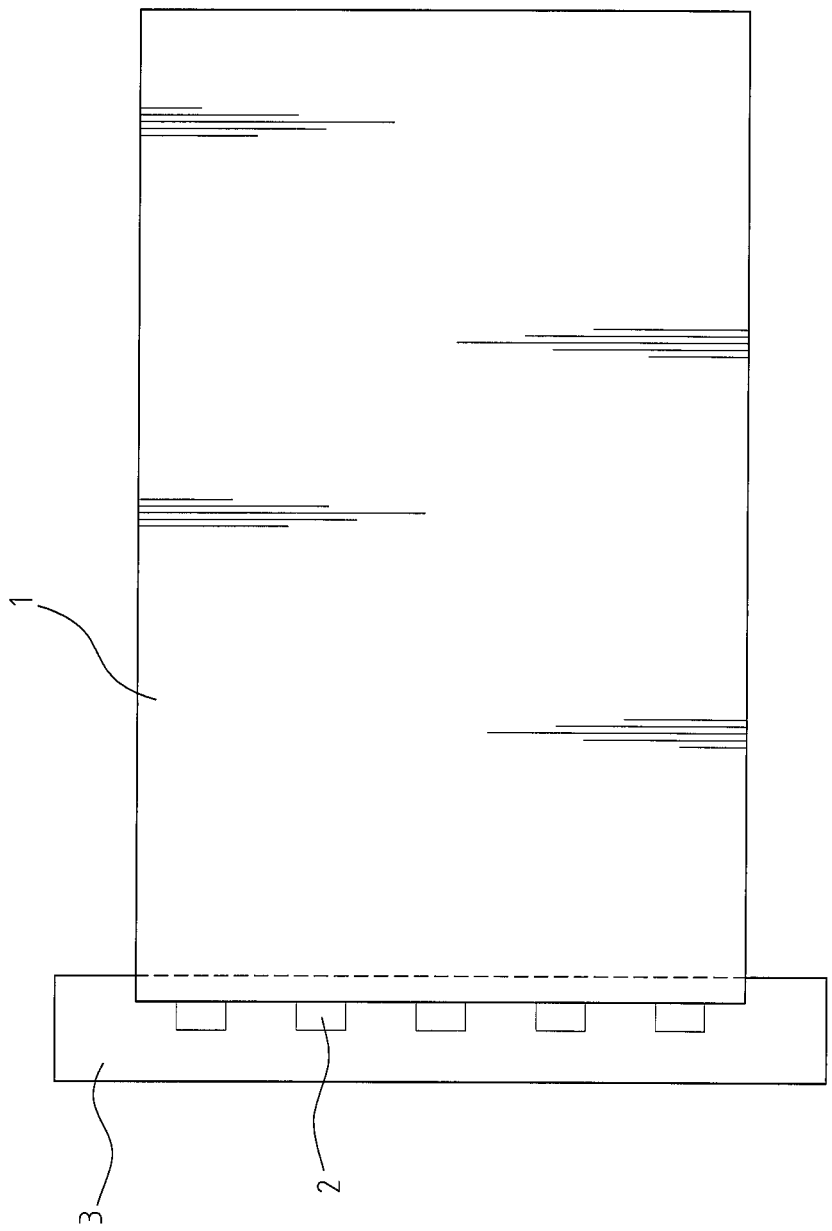
FIG. 1 is a schematic diagram illustrating a conventional backlight module including a light guide plate and light sources assembled together.
Figure 2:
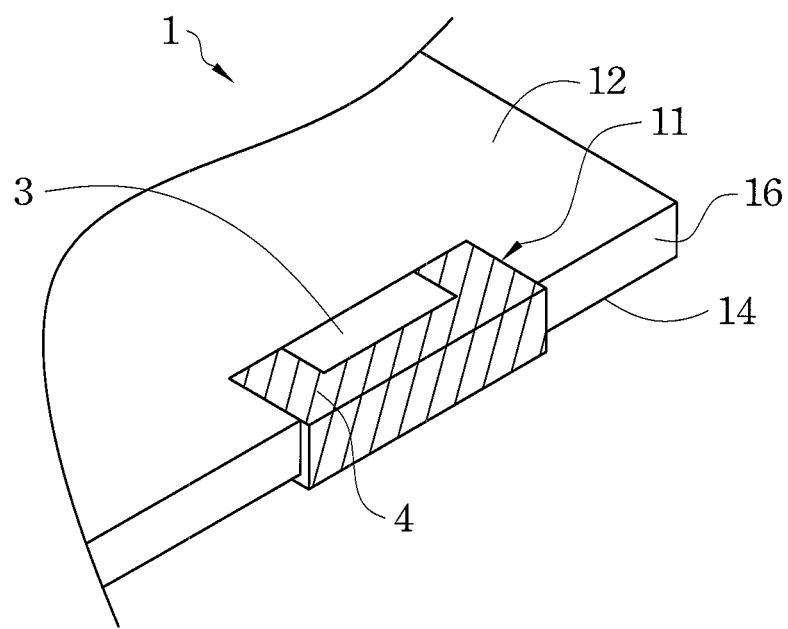
FIG. 2 is an oblique diagram viewed from top of a first embodiment of a light guide apparatus for a backlight module of the invention.
Figure 3:
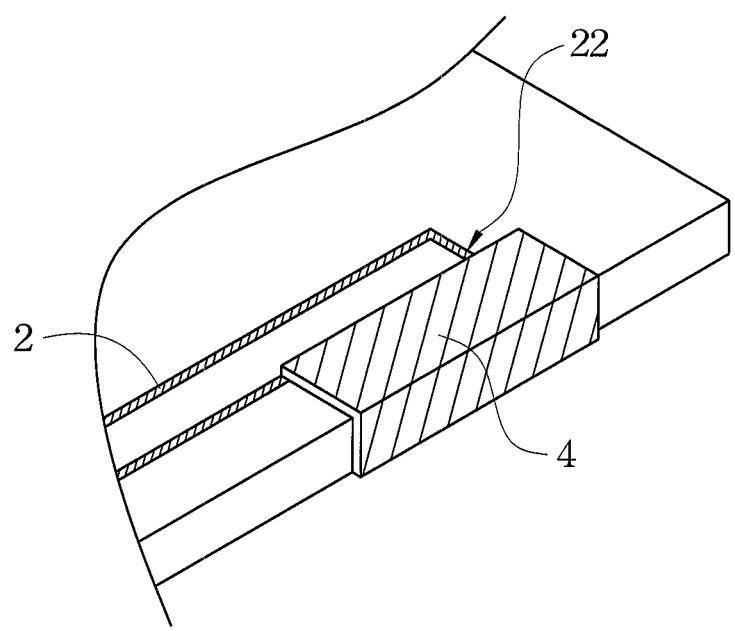
FIG. 3 is an oblique diagram viewed from bottom of the first embodiment of a light guide apparatus for a backlight module of the invention.

Refer to FIG. 2 and FIG. 3 simultaneously. FIG. 2 is an oblique diagram viewed from top of a first embodiment of a light guide apparatus for a backlight module of the invention. FIG. 3 is an oblique diagram viewed from bottom of the first embodiment of a light guide apparatus for a backlight module of the invention. The light guide apparatus for a backlight module includes a light guide plate 1 having a recessed compartment 11, a circuit 2 integrated with the light guide plate 1, a light source 3, and a conductive layer 4. The light source 3 is disposed in the recessed compartment 11. The circuit 2 has a plurality of circuit contacts 22 near the recessed compartment 11. The conductive layer 4 electrically bridges the light source 3 to the circuit contacts 22.

The light guide plate 1 includes a front surface 12, a rear surface 14, and a side surface 16. The front surface 12 is a light-emitting surface of the light guide plate 1, i.e. the light is emitted from the front surface 12 of the light guide plate 1. The rear surface 14 is opposite to the front surface 12, and the light is mostly reflected by the rear surface 14. The side surface 16 connects the front surface 12 and the rear surface 14.

The recessed compartment 11 is a hole passing through the light guide plate 1. The recessed compartment 11 is disposed at a lateral side of the light guide plate 1. The circuit 2 and the circuit contacts 22 thereof are arranged on the rear surface 16 of the light guide plate 1. The light source 3 provides light to the light guide plate 1. The light source 3 is electrically connected to the circuit contacts 22 via the conductive layer 4.

The conductive layer 4 is filled in the recessed compartment 11 and surrounds the light source 3 in the recessed compartment 11. The conductive layer 4 can be an anisotropic conductive film, a graphite layer, or a metal layer.

Figure 4:
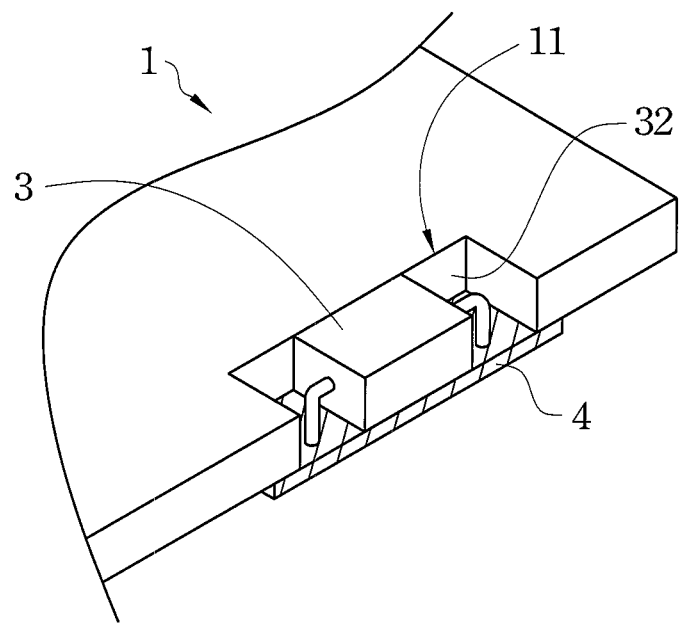
FIG. 4 is an oblique diagram viewed from top of a second embodiment of a light guide apparatus for a backlight module of the invention.
Figure 5:
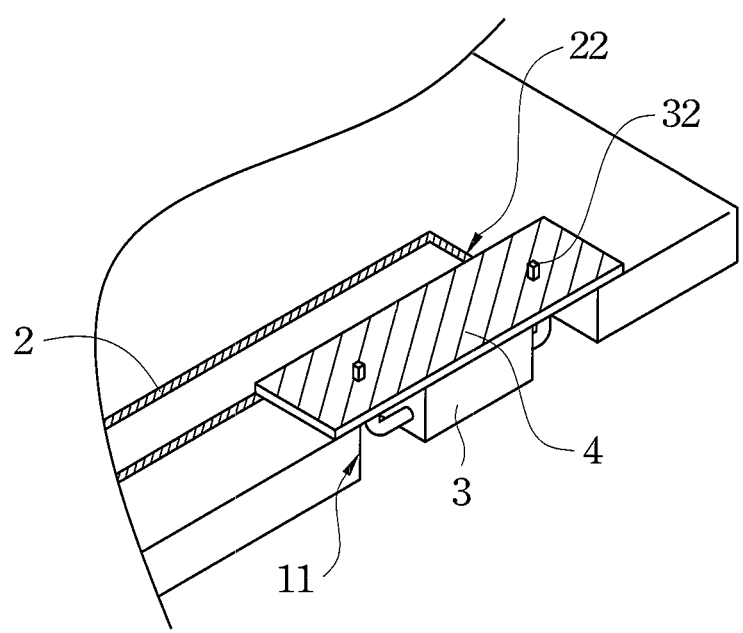
FIG. 5 is an oblique diagram viewed from bottom of the second embodiment of a light guide apparatus for a backlight module of the invention.

Refer to FIG. 4 and FIG. 5 simultaneously. FIG. 4 is an oblique diagram viewed from top of a second embodiment of a light guide apparatus for a backlight module of the invention. FIG. 5 is an oblique diagram viewed from bottom of the second embodiment of a light guide apparatus for a backlight module of the invention. The light guide apparatus for a backlight module includes a light guide plate 1 having the recessed compartment 11, the circuit 2 integrated with the light guide plate 1, the light source 3, and the conductive layer 4. The light source 3 is disposed in the recessed compartment 11. The circuit 2 has a plurality of circuit contacts 22 near the recessed compartment 11. The conductive layer 4 electrically bridges the light source 3 to the circuit contacts 22.

The recessed compartment 11 is a hole in this embodiment. The recessed compartment 11 is disposed adjacent the lateral side of the light guide plate 1. The conductive layer 4 is a sheet disposed on the rear surface of the light guide plate 1. The conductive layer 4 supports the light source 3 within the recessed compartment 11. The conductive layer 4 can be an anisotropic conductive film, a graphite layer, or a metal layer. The conductive layer 4 is in contact with the circuit contacts 22 and is fixed on the light guide plate 1. The light source 3 can be a light emitting diode with a pair of pins 32. The pins 32 plug in or touch the conductive layer 4 to electrically connect to the circuit 2.

Figure 6:
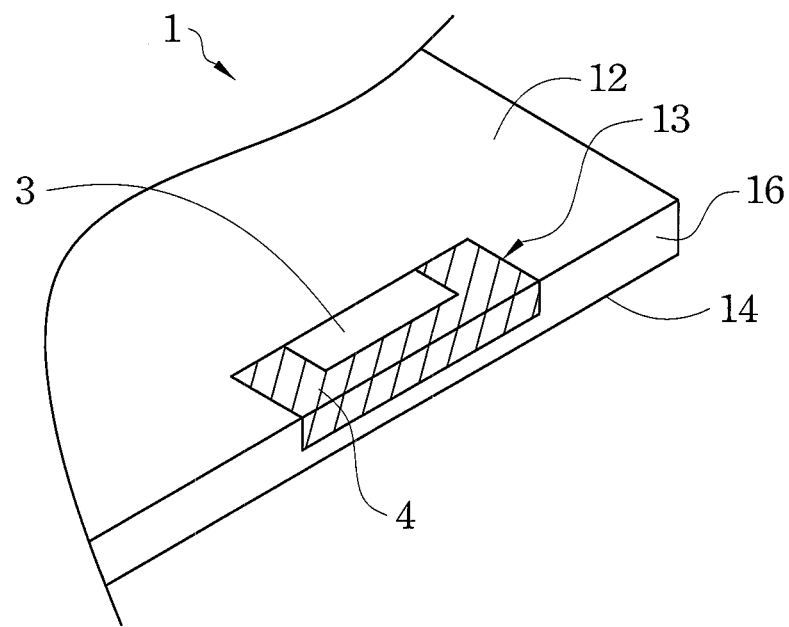
FIG. 6 is an oblique diagram of a third embodiment of a light guide apparatus for a backlight module of the invention.

FIG. 6 is an oblique diagram of a third embodiment of a light guide apparatus for a backlight module of the invention. The recessed compartment 13 is a recess formed on the light guide plate 1. The conductive layer 4 surrounds the light source 3 in the recessed compartment 13 and electrically bridges the light source 3 to the circuit. The conductive layer 4 can be an anisotropic conductive film, a graphite layer, or a metal layer.

Figure 7:
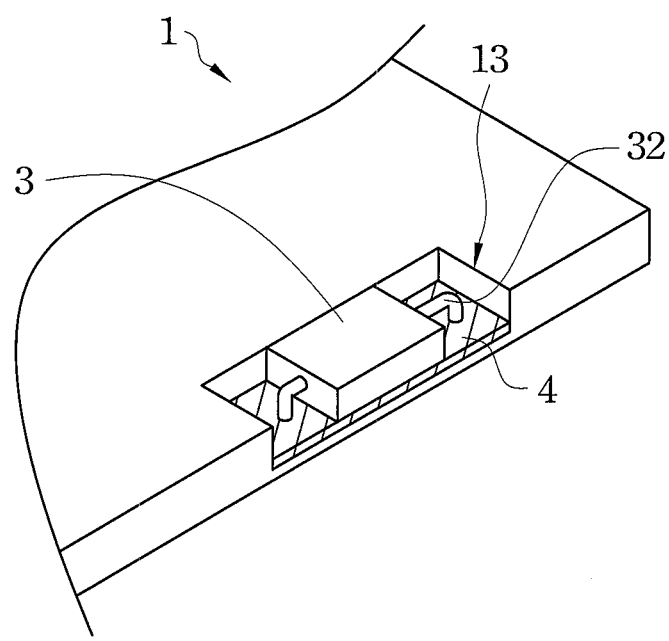
FIG. 7 is an oblique diagram of a fourth embodiment of a light guide apparatus for a backlight module of the invention.

FIG. 7 is an oblique diagram of a fourth embodiment of a light guide apparatus for a backlight module of the invention. The recessed compartment 13 is a recess. The conductive layer 4 is a sheet disposed in the recessed compartment 13. The conductive layer 4 is disposed between the light source 3 and the recessed compartment 13 to electrically bridge the light source 3 to the circuit. The conductive layer 4 can be an anisotropic conductive film, a graphite layer, or a metal layer.

Figure 8:
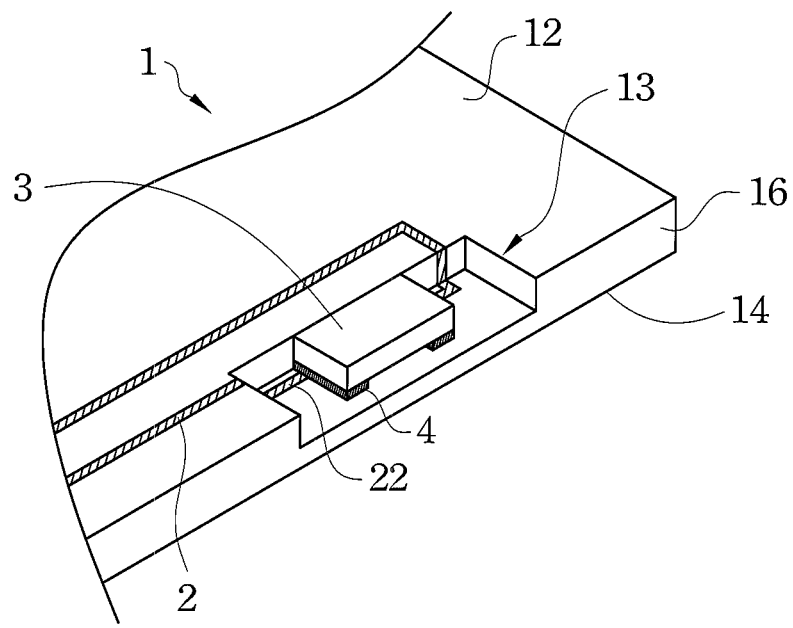
FIG. 8 is an oblique diagram of a fifth embodiment of a light guide apparatus for a backlight module of the invention.

FIG. 8 is an oblique diagram of a fifth embodiment of a light guide apparatus for a backlight module of the invention. The recessed compartment 13 is a recess. The conductive layer 4 is disposed between the light source 3 and the recessed compartment 13 to electrically bridge the light source 3 to the circuit. The conductive layer 4 in this embodiment is a silver paste layer. The silver paste layer is applied on the surface of the light guide plate 1 to electrically bridge the light source 3 to the circuit 2. The electrodes of the light source 3 are in contact with the silver paste layer of the conductive layer 4 respectively.

Figure 9:
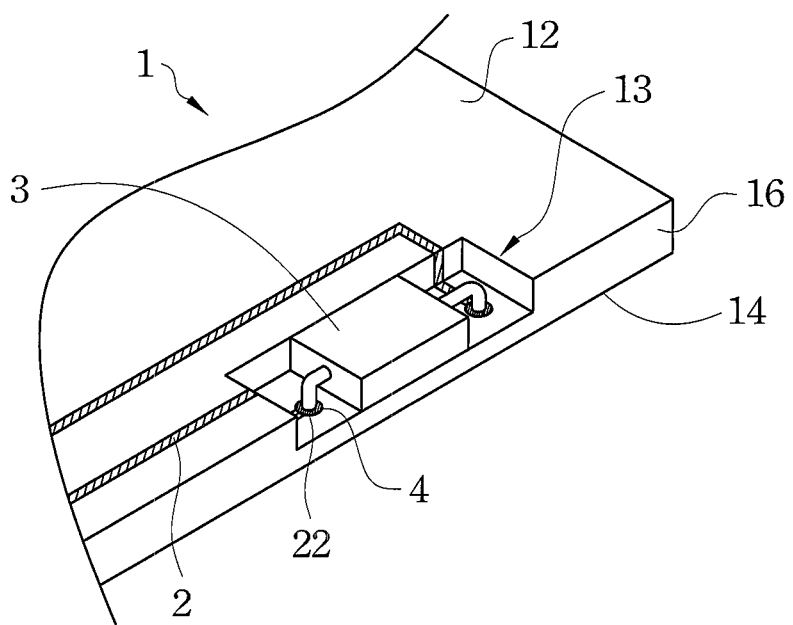
FIG. 9 is an oblique diagram of a sixth embodiment of a light guide apparatus for a backlight module of the invention.

FIG. 9 is an oblique diagram of a sixth embodiment of a light guide apparatus for a backlight module of the invention. The recessed compartment 13 is a recess. The conductive layer 4 in this embodiment includes soldering layers. The soldering layers electrically bridge the electrodes of the light source 3 to the circuit contacts 22 respectively.

Figure 10:
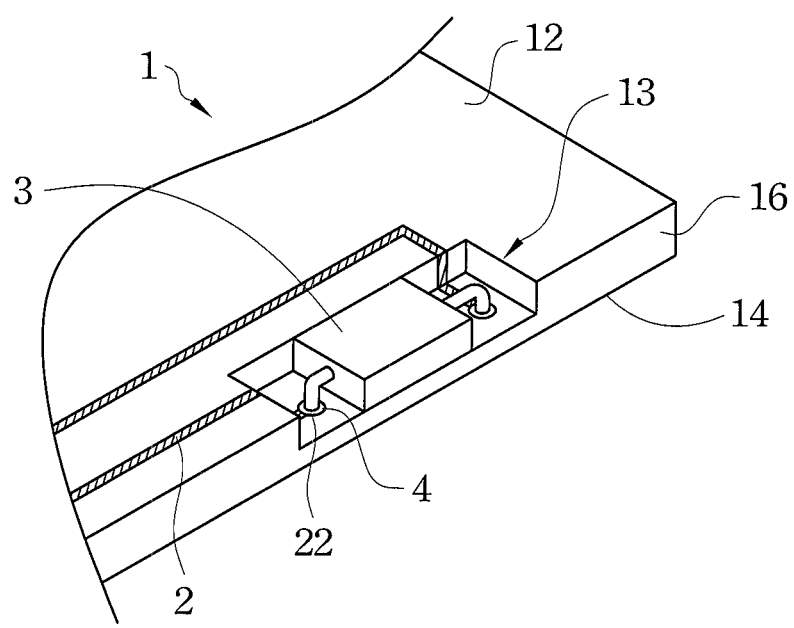
FIG. 10 is an oblique diagram of a seventh embodiment of a light guide apparatus for a backlight module of the invention.

FIG. 10 is an oblique diagram of a seventh embodiment of a light guide apparatus for a backlight module of the invention. The recessed compartment 13 is a recess. The conductive layer 4 in this embodiment is an adhesive, such as UV gel, which is a conductive curable gel. The adhesive of the conductive layer 4 electrically bridges the electrodes of the light source 3 to the circuit contacts 22 respectively.

Figure 11:
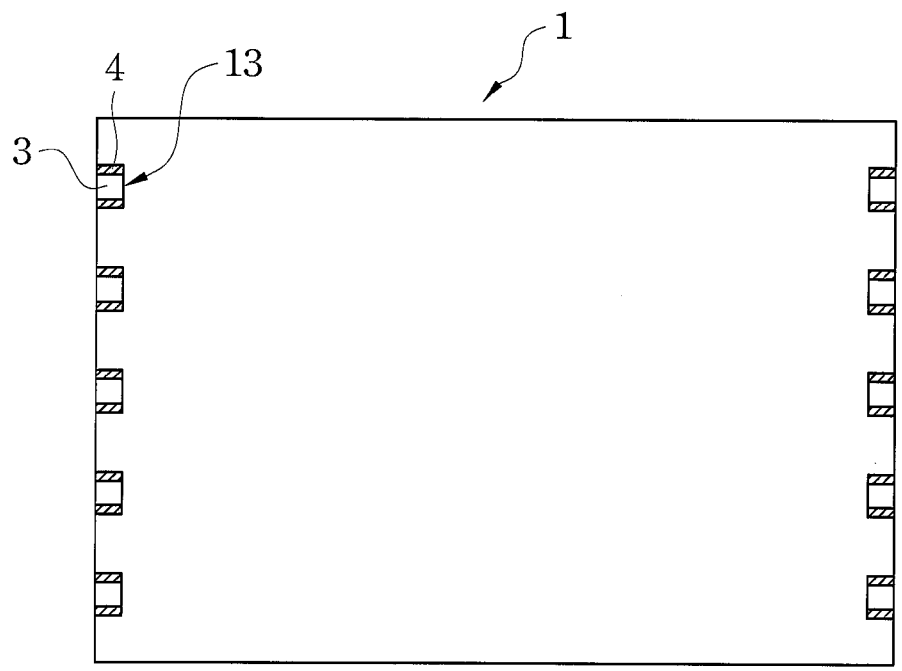
FIG. 11 is a top view diagram of an eighth embodiment of the light guide apparatus for a backlight module of the invention.

FIG. 11 is a top view diagram of an eighth embodiment of the light guide apparatus for a backlight module of the invention. In this embodiment, plural recessed compartments 13 are disposed at a lateral side of the light guide plate 1, and plural recessed compartments 13 are disposed at another lateral side of the light guide plate 1. The recessed compartments 13 can be plural recess.

The conductive layers 4 are disposed in the recessed compartments 13 respectively. The light sources 3 are disposed in the recessed compartments 13 respectively. The conductive layers 4 electrically bridge the light sources 3 to the circuit on the light guide plate 1.

The conductive layers 4 can surround the light sources 3 in the recessed compartments 13. The conductive layers 4 secure and electrically bridge the light sources 3 to the circuit on the light guide plate 1. The conductive layers 4 can be metal layers, graphite layers, anisotropic conductive films, silver paste layers, soldering layers, or adhesive.

Although the light source 3 and recessed compartment 13 are illustrated singular in above embodiment, the number of the light source 3 and the recessed compartment can be plural. Each of the recessed compartments can receive one or more light source.

Figure 12:
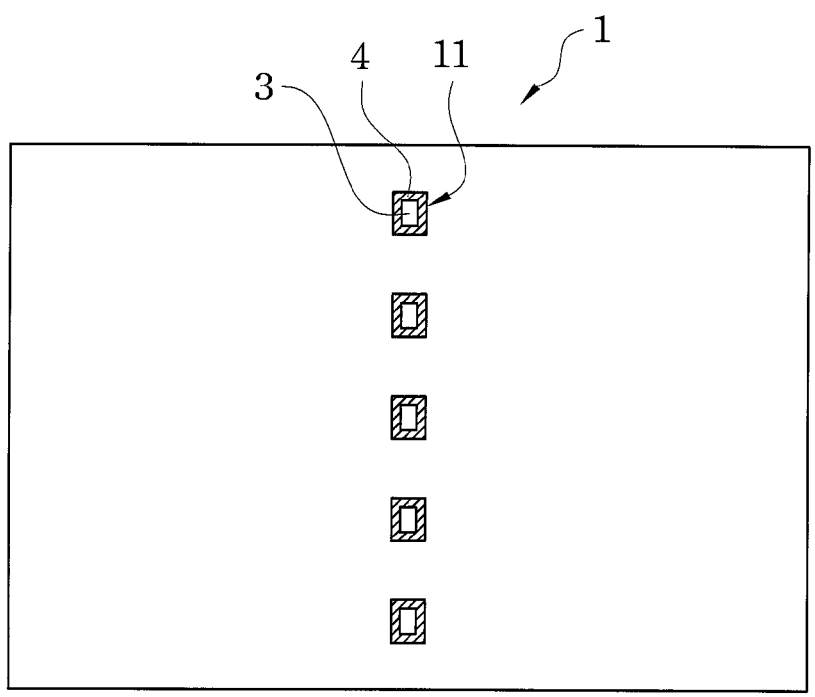
FIG. 12 is a top view diagram of a ninth embodiment of the light guide apparatus for a backlight module of the invention.

FIG. 12 is a top view diagram of a ninth embodiment of the light guide apparatus for a backlight module of the invention. The recessed compartments 11 are disposed near a center area of the light guide plate 1. The recessed compartments 11 are holes passing through the light guide plate 1. The light sources 3 are disposed in the recessed compartments 11 respectively. The light sources 3 face different directions in order to provide uniform light toward the light guide plate 1.

According to above embodiments, the conductive layers are disposed in the recessed compartments respectively to secure and electrically bridge the light sources to the circuit on the light guide plate. The conductive layers can surround the light sources in the recessed compartments. The conductive layers can be sheets disposed between the light sources and the recessed compartments. The conductive layers can be metal layers, graphite layers, anisotropic conductive films, silver paste layers, soldering layers, or adhesive.

Although the light source and recessed compartment are illustrated singular in above embodiments, the number of the light source and the recessed compartment can be plural. Each of the recessed compartments can receive one or more light source.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A light guide apparatus for a backlight module, comprising:
   a light guide plate including a recessed compartment;
   a circuit integrated with the light guide plate and having a plurality of circuit contacts near the recessed compartment;
   a light source disposed in the recessed compartment; and
   a conductive layer electrically bridging the light source to the circuit contacts.

2. The light guide apparatus according to claim 1, wherein the conductive layer is a metal layer.

3. The light guide apparatus according to claim 1, wherein the conductive layer is a graphite layer.

4. The light guide apparatus according to claim 1, wherein the conductive layer is an anisotropic conductive film.

5. The light guide apparatus according to claim 1, wherein the conductive layer is a silver paste layer.

6. The light guide apparatus according to claim 1, wherein the conductive layer is a soldering layer.

7. The light guide apparatus according to claim 1, wherein the conductive layer is an adhesive.

8. The light guide apparatus according to claim 1, wherein the recessed compartment is a recess.

9. The light guide apparatus according to claim 1, wherein the recess compartment is a hole.

10. The light guide apparatus according to claim 1, wherein the recessed compartment is disposed adjacent to a lateral side of the light guide plate.

11. The light guide apparatus according to claim 1, wherein the recessed compartment is disposed at a lateral side of the light guide plate.

12. The light guide apparatus according to claim 1, wherein the recessed compartment is disposed near a center area of the light guide plate.

13. The light guide apparatus according to claim 1, wherein a plurality of the recessed compartments are disposed on opposite lateral sides of the light guide plate.

14. The light guide apparatus according to claim 13, wherein a plurality of the light sources are disposed in the recessed compartment, and a plurality of the conductive layers electrically bridge the light sources to the circuit.

15. The light guide apparatus according to claim 1, wherein the conductive layer surrounds the light source in the recessed compartment.

16. The light guide apparatus according to claim 1, wherein the conductive layer is a sheet.

* * * * *